US012289399B2

(12) United States Patent
Sehrawat et al.

(10) Patent No.: US 12,289,399 B2
(45) Date of Patent: Apr. 29, 2025

(54) DEVICE SPECIFIC MULTIPARTY COMPUTATION

(71) Applicant: Seagate Technology LLC, Fremont, CA (US)

(72) Inventors: Vipin Singh Sehrawat, Shugart (SG); Dmitriy Vassilyev, Longmont, CO (US); Foo Yee Yeo, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/514,755

(22) Filed: Oct. 29, 2021

(65) Prior Publication Data

US 2023/0143175 A1    May 11, 2023

(51) Int. Cl.
  *H04L 9/08* (2006.01)
  *G06F 17/18* (2006.01)

(52) U.S. Cl.
  CPC .............. *H04L 9/085* (2013.01); *G06F 17/18* (2013.01); *H04L 9/0875* (2013.01); *H04L 2209/46* (2013.01)

(58) Field of Classification Search
  None
  See application file for complete search history.

(56) References Cited

U.S. PATENT DOCUMENTS

| 10,630,655 | B2 * | 4/2020 | Becker | ................ H04L 63/0457 |
| 2016/0335440 | A1 | 11/2016 | Clark et al. | |
| 2019/0089687 | A1 * | 3/2019 | Fiske | ....................... H04L 9/304 |
| 2019/0312734 | A1 | 10/2019 | Wentz et al. | |
| 2020/0259651 | A1 | 8/2020 | Mohassel et al. | |
| 2020/0358601 | A1 | 11/2020 | Gama et al. | |
| 2020/0403781 | A1 * | 12/2020 | Gentry | ..................... H04L 9/008 |
| 2022/0374904 | A1 * | 11/2022 | Vaculin | .................. G06N 20/00 |
| 2022/0385461 | A1 * | 12/2022 | Eom | ...................... H04L 9/0891 |
| 2024/0048360 | A1 * | 2/2024 | Dai | ......................... G06N 20/00 |

FOREIGN PATENT DOCUMENTS

| EP | 4096148 A1 | * 11/2022 | |
| WO | WO-2019231392 A1 | * 12/2019 | ........... H04L 63/061 |

OTHER PUBLICATIONS

Mouchet et al. Multiparty Homomorphic Encryption from Ring-Learning-with-Errors; Aug. 18, 2021; pp. 1-18; 10.2478/popets-2021-0071 (Year: 2021).*

(Continued)

*Primary Examiner* — Saleh Najjar
*Assistant Examiner* — Shadi H Kobrosli
(74) *Attorney, Agent, or Firm* — HOLZER PATEL DRENNAN

(57) ABSTRACT

The disclosure provides systems and methods for a multi-party secret sharing protocol that includes determining device channel errors of a plurality of computing devices based on channel impulse response (CIR) of communication channels of the plurality of computing devices, training a linear regression model using the device channel errors to generate learning with error (LWE) secrets for each of the plurality of computing devices, generating a general access structure secret matrix using the LWE secrets from each of the plurality of computing devices, and distributing shares of the general access structure secret matrix to the plurality of computing devices based on a multi-party secret sharing protocol.

20 Claims, 4 Drawing Sheets

(56) References Cited

OTHER PUBLICATIONS

Aono et al. Input and Output Privacy-Preserving Linear Regression; 2017; pp. 1-9; IEICE Trans. Inf. & Syst (Year: 2017).*
Suomalainen et al. Evaluating the Efficiency of Physical and Cryptographic Security Solutions for Quantum Immune IoT; 2018; MDPI; pp. 1-20 (Year: 2018).*
Bogos et al. Optimization of LPN Solving Algorithms; EPFL; 2016; pp. 1-30 (Year: 2016).*
C. Shen, H. Li, G. Sahin, H.-A. Choi and Y. Shah, "Golay Code Based Bit Mismatch Mitigation for Wireless Channel Impulse Response Based Secrecy Generation," in IEEE Access, vol. 7, pp. 2999-3007, 2019, doi: 10.1109/ACCESS.2018.2888489. (Year: 2019).*
Vincent Corlay. Decoding algorithms for lattices. Applications [stat.AP]. Institut Polytechnique de Paris, 2020. pp. 1-157 (Year: 2020).*
Blakley, G. R., "Safeguarding cryptographic keys", American Federation of Information Processing, 1979, 313-317.
Ito, Mitsuru , et al., "Secret Sharing Scheme Realizing General Access Structure", GLOBECOM 1987, 99-102.
Liu Tianren, et al., "Towards Breaking the Exponential Barrier for General Secret Sharing", EUROCRYPT 2018, 567-596.
Shamir, Adi , "How to share a secret", Communications of the ACM, vol. 22, Issue 11, Nov. 1979, 612-613.

* cited by examiner

DEVICE SPECIFIC MULTIPARTY COMPUTATION

BACKGROUND

Secure multiparty computation (MPC) is a technology that enables different parties with private inputs to carry out a joint computation on their inputs without revealing them to each other. It is a cryptographic protocol that distributes a computation across multiple parties where no individual party can see the other parties' data. Generally, any computable function can be computed securely via MPC. Unfortunately, MPC suffers from high communication complexity and only offers costly input verification options. Moreover, efficient MPC schemes are often not post-quantum secure. Furthermore, efficient MPC solutions do not support general access structures in which any number of arbitrary device-sets from a set of devices are authorized to recreate the secret and hence perform MPC.

SUMMARY

In one implementation, the disclosure provides systems and methods for a multi-party secret sharing protocol that is device specific in that the secret matrix used herein is tied to individual computing devices. Specifically, the method includes determining device channel errors of a plurality of computing devices based on channel impulse response (CIR) of communication channels of the plurality of computing devices, training a linear regression model using the device channel errors to generate learning with error (LWE) secrets for each of the plurality of computing devices, generating a general access structure secret matrix using the LWE secrets from each of the plurality of computing devices, and distributing shares of the general access structure secret matrix to the plurality of computing devices based on a multi-party secret sharing protocol, wherein the multi-party secret sharing protocol provides that the general access structure secret matrix cannot be constructed without shares from an authorized set of the computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
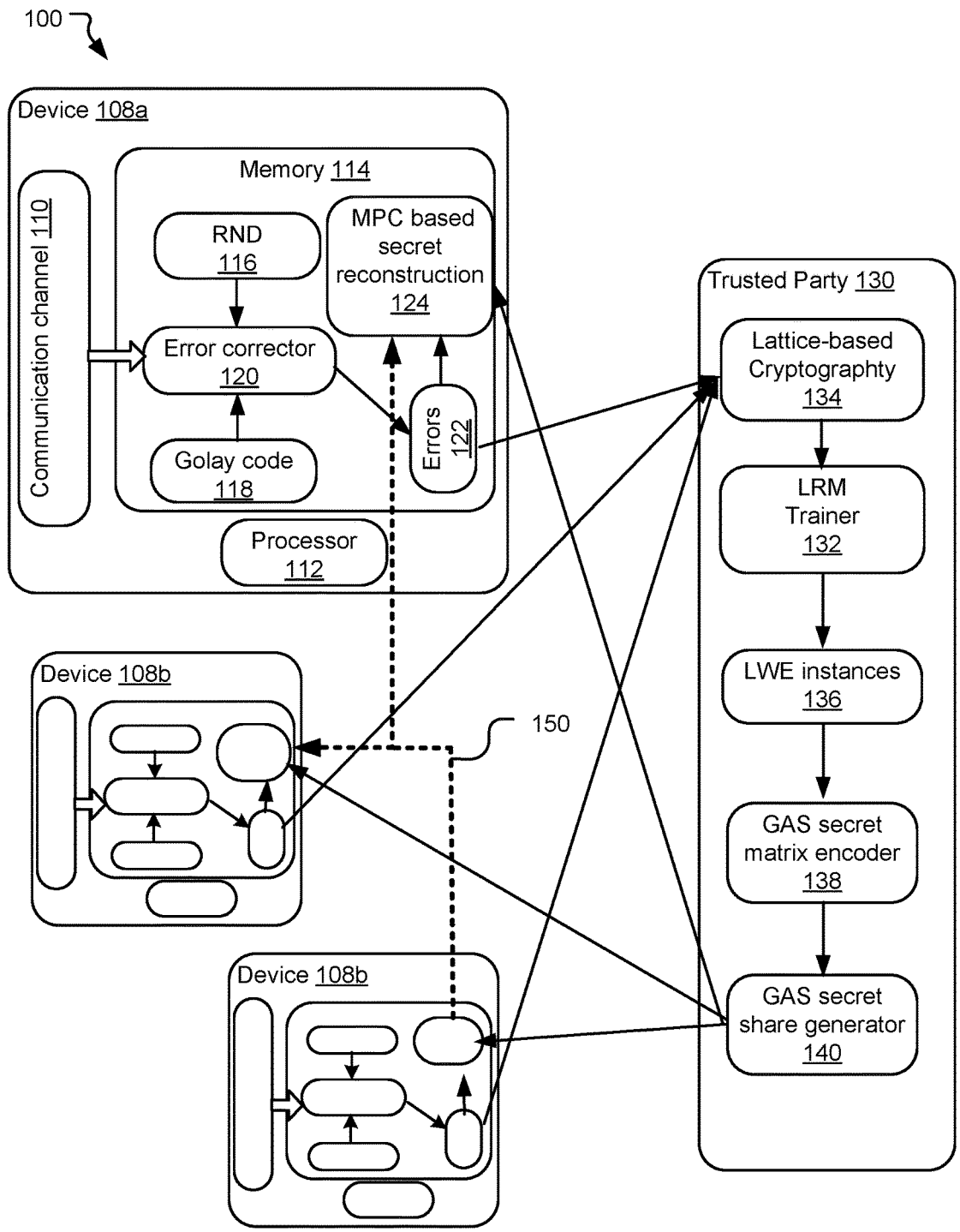
FIG. 1 illustrates an example system that allows multiple parties to share secret in the manner disclosed herein.

Encryption algorithms including block ciphers like advanced encryption standard (AES) encryption, Blowfish™ etc., are device independent. The same holds for pseudorandom functions (PRFs). Device independence here means that it does not matter whether device A or device B performs the algorithm, and it is the key/index alone that selects a particular instance of the encryption algorithm. The technology disclosed herein provides device-specific encryption algorithms and PRF constructions, which can be tied to individual devices. Specifically, such device-specific encryption algorithms are tied to the individual devices in that one or more inherent and/or unique characteristics of the device performing the calculations govern the behavior of the encryption algorithms. Thus, the implementations of the encryption algorithms disclosed herein may behave differently on different devices.

Furthermore, the technology disclosed herein provides device specific two-round secure multiparty communication (MPC) for general access structure of devices with group homomorphism and input verification. Here, MPC refers to implementations that enable different device (or parties) with private inputs to carry out a joint computation on their inputs without revealing their private inputs to each other. Thus, the implementations disclosed herein provide a cryptographic protocol that distributes a computation across multiple devices where no individual device can see the other parties' private inputs.

Implementations of the technology disclosed herein provide a multi-party secret sharing protocol that is device specific in that the secret matrix used herein is tied to individual computing devices. Specifically, the secret matrix may be generated based on inherent and/or unique characteristics of the devices participating in the secret sharing protocol—namely channel impulse responses of the communication channels between the participating computing devices. Furthermore, the secret matrix used herein enforces general access structures, which allows defining any number of arbitrary device-sets from a set of devices that are authorized to recreate the secret and hence perform MPC.

Secret sharing provides a means to distribute shares of a secret so that any authorized subset of participants may reconstruct the secret. In the field of computer science, such a secret may comprise data in a memory device of a computing system comprising one or more computing devices. Shares of the secret (which may alternatively be referred to as share data) may be created. The shares of the secret may correspond to share data that can be provided to a plurality of computing devices. In turn, when shares are received from any authorized subset of participants, the shares may be used to recompute the secret (i.e., recreate the original data of the secret at a computing device). In trivial secret sharing, it may be that all of the computing devices to which share data has been provided must participate in reconstruction of the secret. This, however, is not optimal as certain parties may be compromised or lose the share data. In this scenario, the secret may not be capable of being reconstructed and the secret data lost.

Accordingly, in one example of a secret sharing scheme, a threshold is established corresponding to a given number of participants who must participate in a request to reconstruct the secret to successfully achieve secret reconstruction. In such a scheme, a total number of parties (n) are provided shares such that a threshold (t) number of parties must be participants in secret reconstruction to be successful. This is often referred to as the threshold case or a (t, n)-threshold scheme. In the traditional (t, n)-threshold scheme, the authorized subset of participates required to reconstruct the secret is defined by a publicly known access structure. That is, all participants know that so long as a threshold (t) or greater number of participants provide shares, the secret can be reconstructed.

However, certain scenarios may exist where multiple parties wish to perform secret sharing, but the parties to which a share has been provided do not trust each other completely. A multitude of such scenarios can be contemplated including, for example, potentially adverse business parties, potentially adverse government actors, or any other situation in which distrust between parties may exist. In relation to such a scenario, a solution to address this issue has been proposed that implements an asymmetric trust model. In such an asymmetrical trust model, each party to which a share has been provided is allowed to specify a trust structure. In the trust structure, each party declares which of the other parties having shares that it trusts. Such trust structures may be used to define one or more authorized subsets which specify the parties that are trusted by all or at least a majority of the other parties, and adversary subsets which specify the parties that are not trusted by all or at least a majority of the other parties.

In any regard, once each party having a share declares its trust structure, the protocol (applied by an entity sometimes referred to as a "dealer," which may or may not itself be a party having a share) uses the trust structures declared by each party to generate the authorized subset of participants required to successfully reconstruct the secret using the shares of the authorized subset of participants.

However, prior solutions proposed for asymmetrical trust models require the trust structure of each party to be public. As can be readily understood, it is highly undesirable in practical settings for the trust structure of each party to be known by the other parties in the secret sharing scheme. For instance, heightened animosity, fear of retaliation, souring of relationships, or other adverse outcomes may occur when trust structures are publicly known. In fact, the problem of mandating public trust structures is common among all secret sharing schemes, irrespective of whether a secret sharing scheme supports threshold or general access structures.

Therefore, the solutions disclosed herein provides training a linear regression model using the device channel errors to generate learning with error (LWE) secrets for various devices, generating a secret matrix using the LWE secrets from the various devices, and distributing shares of the secret matrix to the various devices based on a multi-party secret sharing protocol, wherein the multi-party secret sharing protocol provides that the secret matrix cannot be constructed without shares from an authorized set of the devices, and wherein the device channel errors are determined based on channel impulse response (CIR) of communication channels of the various devices.

In view of the foregoing, the following discussion relates to mathematical concepts that facilitate the secret access structures having the properties described above. Specifically, a system may have a plurality of parties defined as $\mathcal{P} = \{P_1, \ldots, P_\ell\}$. An access structure is defined as $\Gamma \subseteq 2^{\mathcal{P}}$, which is a monotone collection of non-empty subsets of the set of parties ($\mathcal{P}$). A collection $\Gamma \subseteq 2^{\mathcal{P}}$ is monotone if $\mathcal{A} \in \Gamma$ and $\mathcal{A} \subseteq \mathcal{B}$ imply that $\mathcal{B} \in \Gamma$. Sets in $\Gamma$ are called authorized and sets not in $\Gamma$ are called not authorized. If $\Gamma$ consists of all subsets of $\mathcal{P}$ with size greater than or equal to a fixed threshold t ($1 \leq t \leq \ell$), then $\Gamma$ is called a t-threshold access structure. For an access structure $\Gamma$, a family of minimal authorized subsets $\Gamma_0 \in \Gamma$ is defined as:

$\Gamma_0 = \{\mathcal{A} \in \Gamma: \mathcal{B}$ is not a subsetsbust of $\mathcal{A}$ for all $\mathcal{B} \in \Gamma \setminus \{\mathcal{A}\}\}$ A computational secret sharing scheme may comprise of a pair of polynomial-time algorithms that are provided respect to an access structure ($\Gamma$), a security parameter ($\omega$), a set of $\ell$ polynomial-time parties $\mathcal{P} = \{P_1, \ldots, P_\ell\}$, and a set of secrets ($\mathcal{K}$). Polynomial-time algorithms are utilized in contrast to exponential algorithms to provide computational efficiency to the secret sharing scheme. In this regard, the secret sharing scheme may be conditionally secure against classical and quantum computing resources.

The polynomial-time algorithms may include a share generation algorithm and a secret reconstruction algorithm. The share generation algorithm is a randomized algorithm that gets a secret that is an element of the secret set ($k \in \mathcal{K}$) and access structure $\Gamma$ as inputs and outputs a share for each of the parties. That is, the share generation algorithm outputs a number of shares equal to the number of parties. The shares may be defined as $(\{\Pi_1^{(k)}, \ldots \Pi_\ell^{(k)}\})$. In turn, each share can be provided to a party in the secret sharing scheme such that the access structure is encoded in the share by the share generation algorithm.

The secret reconstruction algorithm is a deterministic algorithm that gets as inputs the shares of a participating subset of the parties and outputs a string in the secret set. That is, the participating subset may be defined as $\mathcal{A} \subseteq \mathcal{P}$ denoted by $\{\Pi_i^{(k)}\}_{i \in \mathcal{A}}$.

In relation to the share generation algorithm and the secret reconstruction algorithm, the algorithms may provide perfect correctness and computational secrecy. In relation to perfect correctness, for all secrets that are an element of the secret set and every authorized subset in the access structure, the output of the secret reconstruction algorithm is the secret (for all $k \in K$ and every authorized subset $\mathcal{A} \in \theta$, it holds that Pr [Recon($\{\Pi_i^{(k)}\}_{i \in \mathcal{A}}, \mathcal{A}$)=k]=1).

In relation to computational secrecy, for each subset that is not authorized and for any different secrets from the secret set, the distributions of the shares for parties from the unauthorized set are computationally indistinguishable (for every subset $\mathcal{B} \notin \Gamma$ and all different secrets $k_1, k_2 \in \mathcal{K}$, it holds that the distributions $\{\Pi_i^{(k_1)}\}_{i \in \mathcal{B}}$ and $\{\Pi_i^{(k_2)}\}_{i \in \mathcal{B}}$ are computationally indistinguishable with respect to $\omega$). If $\forall k_1, k_2 \in K$ with $k_1 \neq k_2$, the distributions $\{\Pi_i^{(k_1)}\}_{i \in \mathcal{B}}$ and $\{\Pi_i^{(k_2)}\}_{i \in \mathcal{B}}$ are identical, then the scheme is called a perfect sharing scheme.

The present invention generally utilizes Extremal Set Theory to construct set systems under certain intersection restrictions and bounding their size. In relation to utilization of such Extremal Set Theory, in one example, it is provided that $m = \Pi_{i=1}^{r} p_i^{\alpha_i}$ is a positive integer with $r > 1$ different prime divisors. Then there exists an explicitly constructible polynomial Q with n variables and degree $0(n^{1/r})$, which is equal to 0 on $z = (1, 1, \ldots, 1) \in \{0,1\}^n$ but is nonzero mod m on all other $z \in \{0,1\}^n$. Furthermore, $\forall z \in \{0,1\}^n$ and $\forall i \in \{1, \ldots, r\}$, it holds that: $Q(z) \in \{0,1\} \mod p_i^{\alpha_i}$.

In addition, let m be a positive integer, and suppose that m has r>1 different prime divisors: $m = \prod_{i=1}^{r} p_i^{\alpha_i}$. Then there exists $c = c(m) > 0$, such that for every integer $h > 0$, there exists an explicitly constructible uniform set-system $\mathcal{H}$ over a universe of h elements such that:

1. $|\mathcal{H}| \geq \exp\left(c \frac{(\log h)^r}{(\log \log h)^{r-1}}\right)$, 2. $\forall H \in \mathcal{H} : |H| = 0 \mod m$, 3. $\forall G, H \in \mathcal{H}, G \neq H : |G \cap H| \neq 0 \mod m$.

Matching vector (MV) families follow from the foregoing definition in which $m = \prod_{i=1}^{r} p_i^{\alpha_i}$ is a positive integer with r>1 different prime divisors and are used in cryptography in the context of private information retrieval, conditional disclosure of secrets, and secret sharing.

In addition, let m be a positive integer with r>1 different prime divisors: $m = \prod_{i=1}^{r} p_i^{\alpha_i}$, and $S \subseteq \mathbb{Z}_m \setminus \{0\}$. The family of vectors $\{u_i\}_{i=1}^{n}$, $u_i \in (\mathbb{Z}_m)^h$ is said to be S-matching if the following conditions hold:

1. $\langle u_i, u_i \rangle = 0$ for every $i \in [n]$.
2. $\langle u_i, u_j \rangle \in S$ for every $i \neq j$.

where $\langle \cdot \rangle$ denotes the inner product, and h>0 is an integer.

The following result has been proven about the existence of MV families, modulo a non-prime power m. For positive integers h, r and $m = \prod_{i=1}^{r} p_i^{\alpha_i}$, there exists a set S, such that $|S| = 2^r - 1$, and a family of S-matching vectors $\{u_i\}_{i=1}^{n}$, where $u_i \in (\mathbb{Z}_m)^h$, such that $n \geq$ $$\exp\left(c \frac{(\log h)^r}{\log \log^{r-1} h}\right).$$

Hence, MV families exist for values of h that are significantly smaller than n.

The secret sharing scheme described herein may also leverage discrete Gaussian sampling as will now be described. For any center $c \in \mathbb{R}$, and Gaussian parameter $s \in \mathbb{R}^+$, the discrete Gaussian distribution may be defined as:

$$D_{s,c} = \frac{\rho_{s,c}(x)}{\sum_{y=-\infty}^{\infty} \rho_{s,c}(y)},$$

$\forall x \in \mathbb{Z}$, where $\rho_{s,c}(x) = e^{-\pi |x-c|^2/s^2}$ is the Gaussian function. The parameters of discrete Gaussians are governed by the security proofs of the particular cryptosystem. A finite machine cannot sample from a discrete Gaussian distribution, hence one has to sample from a distribution close to it. It is a common practice to require that the statistical distance of the sampled distribution from the desired discrete Gaussian be less than $2^{100}$. A number of Gaussian sampling algorithms for lattice-based cryptosystems may be utilized herein without limitation Furthermore, a novel implementation of cumulative distribution function (CDF) inversion sampler with high precision and large tail bound has been demonstrated with maximum statistical distance of $2^{-90}$ to a theoretical discrete Gaussian distribution. Such a sampler may take on average 9.44 random bits and 2.28 clock cycles to generate a sample and consumes 1 block RAM with 17 slices on a Spartan-6 FPGA. Hence, efficient and practical Gaussian sampling for lattice-based cryptography is becoming more practical.

Generation of shares may also utilize concepts related to the Learning With Errors (LWE) problem. The learning with errors (LWE) problem requires to recover a secret s given a sequence of 'approximate' random linear equations on it. LWE is known to be hard based on certain assumptions regarding the worst-case hardness of standard lattice problems such as GapSVP (decision version of the Shortest Vector Problem) and SIVP (Shortest Independent Vectors Problem). Many cryptosystems have been constructed whose security can be proven under the LWE problem, including (identity-based, leakage-resilient, fully homomorphic, functional) encryption, oblivious transfer, (blind) signatures, pseudorandom functions (PRFs), key-homomorphic PRFs, key-homomorphic constrained PRFs, hash functions, etc.

Two examples of implementation of LWE are described. The first is Decision-LWE. In this example, for positive integers n (the security parameter) and $q \geq 2$, and an error (probability) distribution $x = x(n)$ over $\mathbb{Z}_q$, the decision-LWE$_{n,q,x}$ problem is to distinguish between the following pairs of distributions:

(A, A$^T$s+e) and (A, u), where $$m = \text{poly}(n), A \xleftarrow{\$} \mathbb{Z}_q^{n \times m}, s \xleftarrow{\$} \mathbb{Z}_q^n, e \xleftarrow{\$} \chi^m, \text{ and } u \xleftarrow{\$} \mathbb{Z}_q^m.$$

The other is Search-LWE for which positive integers n (the security parameter) and $q \geq 2$, and an error (probability) distribution $x = x(n)$ over $\mathbb{Z}_q$, the search-LWE$_{n,q,x}$ problem is to recover $s \in \mathbb{Z}_q^n$, given $m(=(n))$ independent samples of (A, A$^T$ s+e), where $$A \xleftarrow{\$} \mathbb{Z}_q^{n \times m}, s \xleftarrow{\$} \mathbb{Z}_q^n, \text{ and } e \xleftarrow{\$} \chi^m.$$

For security parameter $\lambda$ such that $n = (\lambda)$, it has been proven that for a certain noise distribution x and a sufficiently large q, the LWE problem is as hard as the worst-case SIVP (Shortest Independent Vectors Problem) and GapSVP (decision version of the Shortest Vector Problem) under a quantum reduction. These results have been extended to show that s can be sampled from a low norm distribution (in particular, from the noise distribution x) and the resulting problem is as hard as the basic LWE problem. Similarly, the noise distribution x can be a simple low-norm distribution.

Note that the seed and error vectors in the definitions can be replaced by matrices of appropriate dimensions, that are sampled from the same distributions as the vectors. Such interchange does not affect the hardness of LWE.

The present disclosure may also utilize Trapdoors for Lattices. Trapdoors for lattices utilized in the present disclosure are provided herein. For example, let $m \geq nk$ be an integer and $\overline{m} = m - nk$. For $A \in \mathbb{Z}_q^{n \times m}$, it may be that $R \in \mathbb{Z}_q^{\overline{m} \times nk}$ is a trapdoor for A with tag $H \in \mathbb{Z}_q^{n \times n}$ if $$A \begin{bmatrix} R \\ I \end{bmatrix} = H \cdot G,$$

where $G \in \mathbb{Z}_q^{n \times nk}$ is a primitive matrix.

Given a trapdoor R for A, and an LWE instance B=AS+E mod q for some "short" (with small enough infinity or Euclidean norm) error matrix E∈ $\mathbb{Z}^{m \times n}$, the LWE inversion algorithm from successfully recovers S (and E) with overwhelming probability.

FIG. 1 illustrates an example secret sharing system 100 that allows multiple parties to share and recreate secret in the manner disclosed herein. The secret sharing system 100 may include several devices, such as device 108a, 108b, 108n, etc., (referred to as 108). In one implementation, the devices 108 can be arranged in a directed acyclic graph structure. The devices 108 may be computing devices such as laptops, desktops, servers, mobile phones, tablets, etc. Each of the devices 108 may include a communication channel 110, a processor 112, a memory 114, and several other components. An example of a computing device that maybe used to implement the device 108 is disclosed in FIG. 4 below.

The communication channel 110 may be implemented using a physical transmission medium, preferably, a wireless channel. The communication channel 110 may be used to communicate data between various components of the device 108, such as data between the processor 112 and the memory 114, the processor and one or more input/output devices, etc. The communication channel 110 may be characterized by its impulse response, referred to here as the channel impulse response (CIR). Specifically, the CIR of the communication channel 110 may be represented by the output of the communication channel 110 when it is presented with a brief input signal or an impulse.

Specifically, CIR of the communication channel 110 represents reaction of the communication channel 110 in response to an input change. The CIR of communication channel 110 is unique for each communication channel 110 of the computing devices. Thus, the CIR of the communication channel 110 of device 108a is different than the CIR of the communication channel 110 of the device 108b, and they are both different from the CIR of the communication channel 110 of the device 108n. In the illustrated implementation, the CIR of the communication channel 110 is used as discrete gaussian error for the devices.

The memory 114 may include various computer programmable instructions that may be executable over the processor 112. In one implementation, the memory 114 includes a Golay code generator 118 that is configured to generate Golay codes and a random number generator (RND) 116 that is configured to generate random numbers. The Golay codes generated by the Golay code generator 118 may be a 24-bit extended binary code or a 23-bit perfect binary code.

An error corrector 120 may receive a digitized version of the CIR for the communication channel 110 and use the Golay code received from the Golay code generator 118 to correct device specific errors 122. Specifically, the error corrector 120 receives CIR $c_i$ from the communication channel 110 for a number of iterations of the communication channel and uses the Golay codes to generate the corrected CIR vector $c_i'$. The corrected errors 112 generated by the error corrector 1120 maybe represented by $y_i = c_i - c_i'$, which can be turned into an element from the desired learning with error (LWE) error distribution by using specifically designated deterministic random number generator RND 116.

Subsequently, the error vector 122 from each of the various devices 108 are communicated to a dealer or a trusted party 130 (referred to hereinafter as the trusted party 130). For example, the trusted party 130 may be a trusted party that generates and encodes a secret matrix that may be used by the devices 108 to implement an MPC solution. Specifically, the trusted party 130 may be implemented on a server that is communicatively connected to the devices 108. Alternatively, one of the devices 108, that is arranged in a directed acyclic graph may function as the trusted party 130.

The trusted party 130 may include a lattice-based cryptography module 134 that is configured to provides sampling from discrete gaussian distribution of errors 120 received from various devices 120. The samplings generated by the lattice-based cryptography module 134 are input to a linear regression model (LRM) 132 that generates training data of LWE instances 136 to ensure that the distribution of the LWE instances 136 is discrete gaussian, while still preserving the hardness of LWE. This is referred to herein as learning with linear regression (LWLR).

A general access structure (GAS) secret matrix generator 138 generates a secret matrix using the LWE instances 136. Subsequently, a GAS secret share generator 140 generates shares of the GAS secret matrix for each of the devices 108. In one implementation, the GAS secret share generator 140 may generate shares for the devices by using a vector family V as per the corollary 2 described below:

---

Corollary 2. Let $m = p_1^{\alpha_1} p_2^{\alpha_2} \ldots p_r^{\alpha_r}$ be a positive integer with r > 1 distinct prime divisors, and $1 \geq 2$ be an integer such that $1 < \min(p_1, p_2, \ldots, p_r)$. Then, there exists c > 0 such that for all integers $t \geq 2$ and $h \geq lm$, there exists a family of vectors $v = \{u_i^N\}_{i = l}$, such that:

1. $\forall i \in [N]$, it holds that: $\langle u_i, U \rangle = 0 \mod m$,
2. V has t-wise restricted intersections modulo m.
3. $\forall i, j \in [N]$, where $i \neq j$, it holds that:

$$\langle u_i, u_j \rangle \mod m = \begin{cases} 0 & \text{if } H_i \subsetneq H_j \text{ or } H_j \subsetneq H_1 \\ \neq 0 & \text{otherwise.} \end{cases}$$

4. (follows from Remark 1) for each $i \in [N]$, there exists either $2^{l-1}$ or 1 number of $j \in [N]$ ($j \neq i$) such that $\langle u_i, u \rangle = 0 \mod m$.

As described in Corollary 2, let V be a vector family consisting of representative vectors for the sets in some set-system $\mathcal{H}$. We define a k-multilinear form on $V^k$ by:

$$\langle w_1, w_2, \ldots, w_k \rangle_k = \Sigma_{i=1}^h w_1, w_2, i \ldots w_k, i.$$

For any $v \in V$, we will use the same symbol v to represent the corresponding set in $H \in \mathcal{H}$ (by a slight abuse of notation). Let $u, v_1, v_2 \in V$. Then $$\langle u, v_1 \cup v_2 \rangle = |u \cap (v_1 \cup v_2)| = |u \cap v_1) \cup (u \cap v_2)|$$

$$= |(u \cap v_1)| + |(u \cap v_2)| - |u \cap v_1 \cap v_2|$$

$$= \langle u, v_1 \rangle + \langle u, v_2 \rangle - \langle u, v_1, v_2 \rangle_3.$$

-continued

So by defining F to be
$$F(x,y,z) = x+y-z,$$
we have
$$F(\langle u, v_1\rangle, \langle u, v_2\rangle, \langle u, v_1, v_2\rangle_3) = \langle u, v_1 \cup v_2\rangle.$$
Similarly, $$\langle u, v_1, v_2 \cup v_3\rangle_3 = |u \cap v_1 \cap (v_2 \cup v_3)| = |(u \cap v_1 \cap v_2) \cup (u \cap v_1 \cap v_3)|$$

$$= |u \cap v_1 \cap v_2| + |u \cap v_1 \cap v_3| - |u \cap v_1 \cap v_2 \cap v_3|$$

$$= \langle u, v_1, v_2\rangle + \langle u, v_1, v_2\rangle - \langle u, v_1, v_2, v_3\rangle_4.$$

So
$$F(\langle u, v_1, v_2\rangle_3, \langle u, v_1, v_3\rangle_3, \langle u, v_1, v_2, v_3\rangle_4) = \langle u, v_1, v_2 \cup v_3\rangle_3.$$
In similar fashion, we can compute
$$\langle u, v_1 \cup v_2 \cup \ldots \cup v_l\rangle$$
if we know the values of the k-multilinear forms $\langle w_1, w_2, \ldots, w_k\rangle_k$ for all $k \leq l + 1$ and for all $w_i \in V$.

Each device 108 gets shares as $c_i = \langle u, u_i\rangle \mod m$, where $$i \xleftarrow{\$} [N]$$

is used to randomly sample $u_i \in V$. Here the vector u is same for each party.

The devices 108 also include an MPC based secret reconstruction module 124 that is able to use the shares received from the GAS secret share generator 140. For each device 108, the LWE see for GGH15 encoding is computed as $S^{c_i} \mod q$, where $m=\phi(q)$. If a device 108's input for MPC protocol is $b_i$, then it generates its MPC input as $D_i \cdot S^{b_i} \mod q$. The memory of the device 108 may also include a multiparty computation (MPC) secret constructor 124 that is configured to reconstruct the secret using the shares received from the GAS secret share generator 140 as well as MPC inputs, which are custom $c_j$ values, from other devices 108.

Here the GGH15 scheme is one type of family of multilinear maps, based on the LWE problem with encoding over matrices. A graded encoding scheme for an algebraic "plaintext ring R" provides methods for encoding the ring elements and manipulating the resulting encodings. Such schemes allow a "canonical representation" of the plaintext element to be extracted from its encoding. GGH15 encodes LWE samples in short square matrices of higher dimensions. Addition and multiplication of the encodings corresponds to addition and multiplication of the LWE secrets. The plaintext space is the non-commutative ring of matrices $R=\mathbb{Z}_q^{n\times n}$. The construction is parametrized by a directed acyclic graph (DAG), G=(V, E), with diameter d. A matrix $$A_v \xleftarrow{\$} \mathbb{Z}_q^{m\times n}$$

is associated with each node $v \in V$, and encodings in the scheme are defined relative to the paths in G. A small plaintext matrix $S \in R$ is encoded with respect to a path $u \rightsquigarrow v$ via another small matrix $D \in \mathbb{Z}_q^{m\times m}$, such that $D \cdot A_u \approx A_v \cdot S$. Given 'trapdoor information' $\tau_u$ for matrix $A_u$ and error distribution $x = D_{\mathbb{Z},s}$, GGH15 generates an encoding D for S with respect to source u and sink v, such that: $D \cdot A_u = A_v \cdot S + E$, where $E \leftarrow (X)^{m\times n}$ is an LWE error matrix. As the trapdoor information is given for $A_u$ and not $A_v$, the LWE instance $\{A_v, B_v(=A_v \cdot S+E)\}$ can still be hard for appropriate parameters. The arithmetic operations are just matrix operations in $\mathbb{Z}_q^{m\times n}$. It is easy to see that two encodings, $D_1$ and $D_2$, relative to the same path $u \rightsquigarrow v$ can be added, namely from: $D_1 \cdot A_u = A_v \cdot S_1 + E_1$ and $D_2 \cdot A_u = A_v \cdot S_2 + E_2$, we obtain: $(D_1+D_2) \cdot A_u = A_v \cdot (S_1+S_2) + E_1 + E_2$, all matrices, $S_1+S_2$, $E_1+E_2$ and $D_1+D_2$, are still small. Encodings relative to paths $v \rightsquigarrow w$ and $u \rightsquigarrow v$, can be multiplied to get an encoding relative to path $u \rightsquigarrow w$. Namely given $D_1 \cdot A_v = A_w \cdot S_1 + E_1$ and $D_2 \cdot A_u = A_v \cdot S_2 + E_2$, we obtain: $D_1 \cdot D_2 \cdot A_u = D_1 \cdot (A_v \cdot S_2 + E_2) = A_w \cdot S_1 \cdot S_2 + E'$, the matrices, $D_1 \cdot D_2$, $S_1 \cdot S_2$ and $E'$ are still small.

Figure 2:
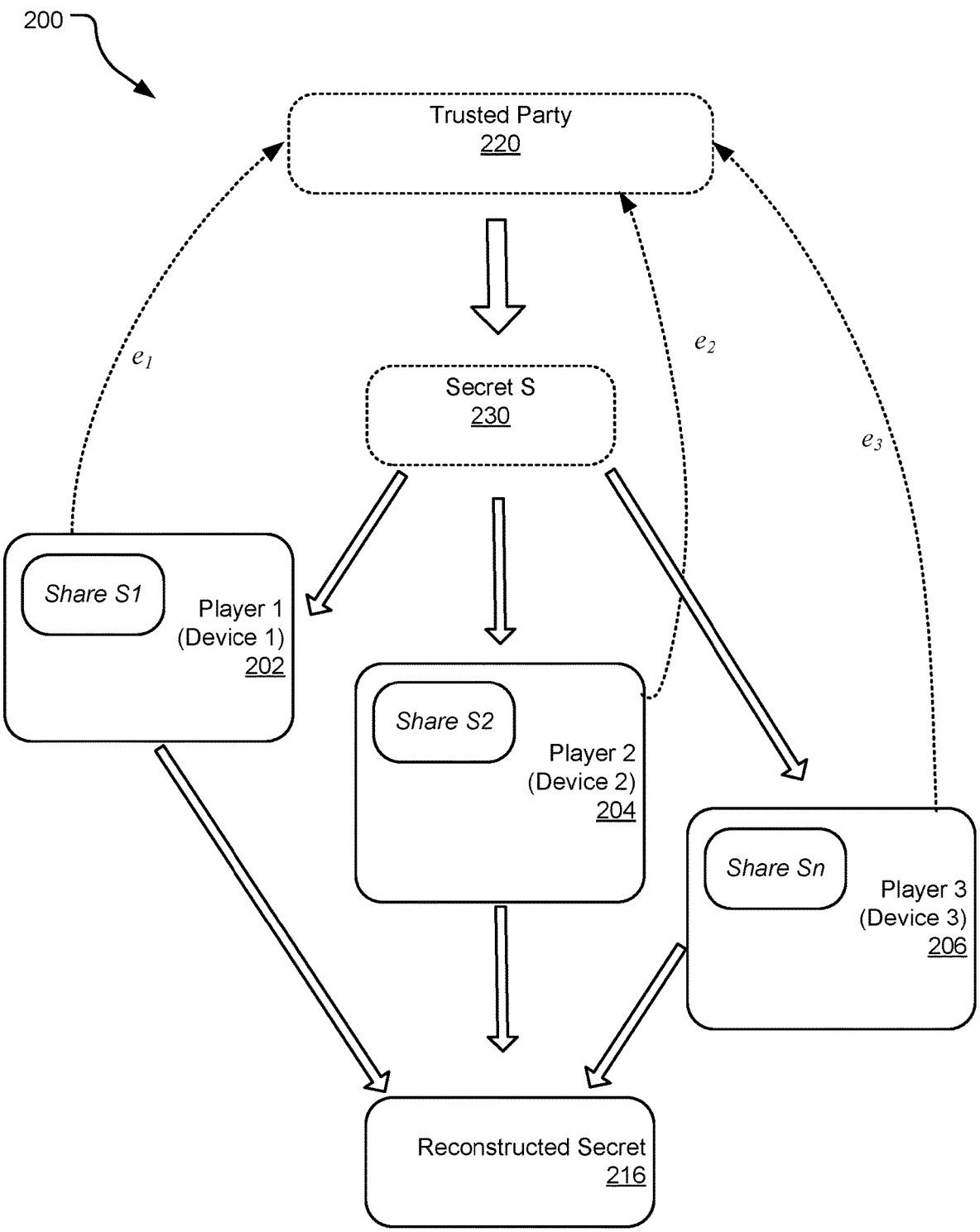
FIG. 2 illustrates a visual depiction of a procedure for using the secret sharing in the manner disclosed herein.

FIG. 2 illustrates a visual depiction of a secret sharing structure 200 in the manner disclosed herein. Specifically, the secret sharing structure 200 generates shares of a secret S 230 using a trusted party 220, such as the trusted party 130 disclosed in FIG. 1. For example, the shares of the secret S 230, which may constitute a GAS secret matrix, may be represented by shares S1, S2, S3, etc. Subsequently, the shares S1, S2, S3 are distributed to player 1 202, player 2 204, and player 3 206. For example, the player 1 202 may be a first device, the player 2 204 may be a second device, and the player 3 206 may be a third device.

In such a secret sharing structure 200, the secret S may be generated based on the device channel errors of each of the devices 202, 204, and 206. Furthermore, the device channel errors of these devices 202, 204, and 206 may be based on CIR of the communication channels of these devices 202, 204, and 206. Thus, the devices 202, 204, and 206 may generate device channel errors e, based on CIR of their individual communication channels and communicate the device channel errors e, to a trusted party 220.

The trusted party 220 may in turn use the errors e to train a linear regression model to generate LWE secrets that can be used to generate the secret S 230. Specifically, the secret S 230 may be a secret matrix. Subsequently, shares S1, S2, and S3 may represent shares for each of the devices 202, 204, and 206 in the secret matrix S 230. The shares S1, S2, and S3 are distributed to the devices. Specifically, the shares S1, S2, and S3 are configured such that the general access structure secret matrix S cannot be constructed without shares from an authorized set of the devices 202, 204, and 206. For example, in one implementation, such authorized set may be at least two of S1, S2, and S3. Alternatively, such authorized set may be a combination of S1, S2, and S3 that overcomes a pre-determined threshold. If the combination of the S1, S2, and S3 meets the requirements of the authorized set, the reconstructed secret 216 generated from such authorized set may be used for providing access to one or more of the devices 202, 204, and 206.

Figure 3:
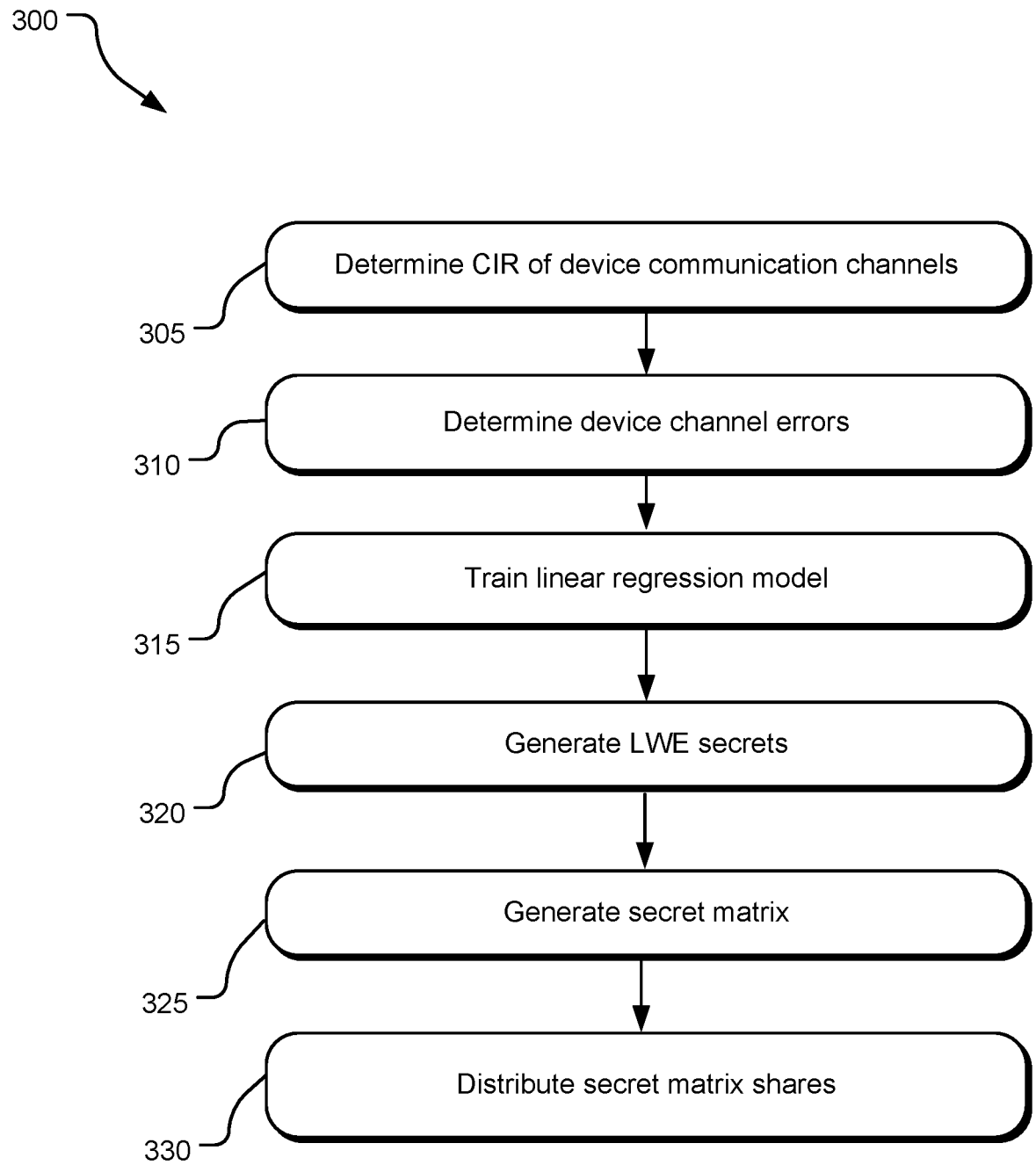
FIG. 3 illustrates example operations for parties to use secret sharing in the manner disclosed herein.

FIG. 3 illustrates operations 300 for parties to use secret sharing in the manner disclosed herein. One or more of the operations 300 may be implemented by computer instructions stored on a computer readable media where the computer instructions are executable on a computer processor. A determining operation 305 may determine channel impulse responses (CIRs) of device communication channels of various computing devices. Another determining operation 310 uses the CIRs of the device communication channels to generate device channel errors.

Subsequently, a training operation 315 may train a linear regression model using device channel errors to generate learning with error (LWE) secrets for each of various computing devices. An operation 320 may generate learning with error (LWE) secrets for each of the various computing devices and an operation 325 may generate a secret matrix based on the LWE secrets from the various computing devices. Subsequently, the shares of the secret matrix to the various computing devices are distributed at an operation 330. Specifically, the operation 330 may distribute the shares of the secret matrix to the various computing devices based on a multi-party secret sharing protocol, wherein the multi-party secret sharing protocol provides that the secret matrix cannot be constructed without shares from an authorized set of the computing devices.

In the above examples, the various modules shown and described with respect to the computing devices (e.g., the communication error detector and correct, hardware error detector and corrector, deterministic error modeler, signature generator, verification module, signature combiner, and broadcaster) may be all be understood as include software stored on a tangible-computer readable storage media. As used herein, "tangible computer-readable storage media" is defined to explicitly excluded carrier waves freely propagating in space and to include memory devices including without limitation RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device.

Figure 4:
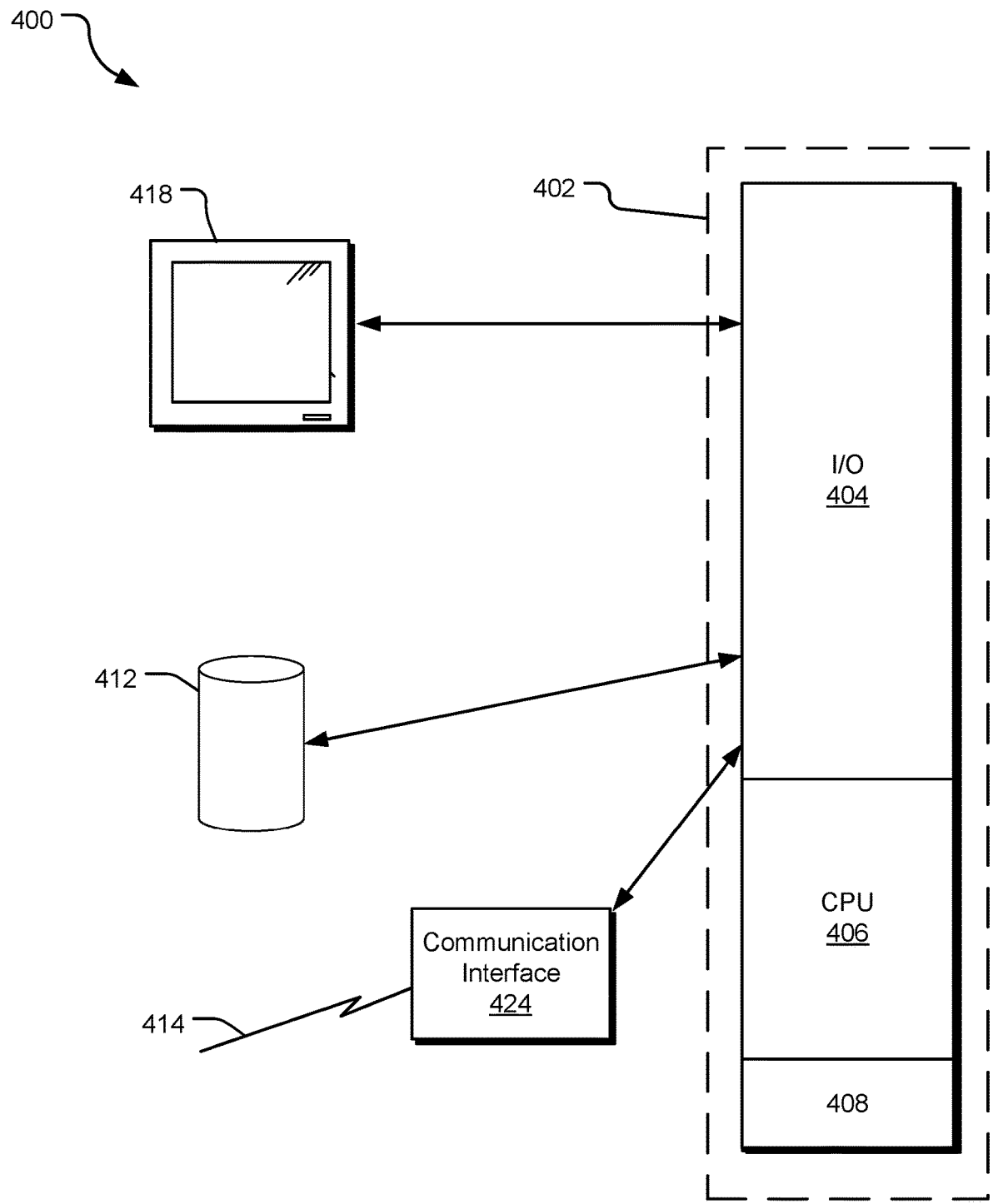
FIG. 4 illustrates an example processing system that may be useful in implementing the described technology.

FIG. 4 illustrates an example processing system 400 that may be useful in implementing the described technology. The processing system 400 is capable of executing a computer program product embodied in a tangible computer-readable storage medium to execute a computer process. Data and program files may be input to the processing system 400, which reads the files and executes the programs therein using one or more processors (CPUs or GPUs). Some of the elements of a processing system 400 are shown in FIG. 4 wherein a processor 402 is shown having an input/output (I/O) section 404, a Central Processing Unit (CPU) 406, and a memory section 408. There may be one or more processors 402, such that the processor 402 of the processing system 400 comprises a single central-processing unit 406, or a plurality of processing units. The processors may be single core or multi-core processors. The processing system 400 may be a conventional computer, a distributed computer, or any other type of computer. The described technology is optionally implemented in software loaded in memory 408, a storage unit 412, and/or communicated via a wired or wireless network link 414 on a carrier signal (e.g., Ethernet, 3G wireless, 8G wireless, LTE (Long Term Evolution)) thereby transforming the processing system 400 in FIG. 4 to a special purpose machine for implementing the described operations. The processing system 400 may be an application specific processing system configured for supporting a distributed ledger. In other words, the processing system 400 may be a ledger node.

The I/O section 404 may be connected to one or more user-interface devices (e.g., a keyboard, a touch-screen display unit 418, etc.) or a storage unit 412. Computer program products containing mechanisms to effectuate the systems and methods in accordance with the described technology may reside in the memory section 408 or on the storage unit 412 of such a system 400.

A communication interface 424 is capable of connecting the processing system 400 to an enterprise network via the network link 414, through which the computer system can receive instructions and data embodied in a carrier wave. When used in a local area networking (LAN) environment, the processing system 400 is connected (by wired connection or wirelessly) to a local network through the communication interface 424, which is one type of communications device. When used in a wide-area-networking (WAN) environment, the processing system 400 typically includes a modem, a network adapter, or any other type of communications device for establishing communications over the wide area network. In a networked environment, program modules depicted relative to the processing system 400 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 408 and/or the storage unit 412 and executed by the processor 402. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 408 and/or the storage unit 412 and executed by the processor 402.

The processing system 400 may be implemented in a device, such as a user device, storage device, IoT device, a desktop, laptop, computing device. The processing system 400 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
    generating channel impulse response (CIRs) of communication channels of the plurality of computing devices;
    determining, using a Golay code received from a Golay code generator, a vector of device specific channel errors of a plurality of computing devices based on the CIRs of communication channels of the plurality of computing devices;
    training a linear regression model using the vectors of the device specific channel errors from the plurality of computing devices to generate learning with error (LWE) secrets for each of the plurality of computing devices;
    generating a general access structure secret matrix using the LWE secrets from each of the plurality of computing devices; and
    distributing shares of the general access structure secret matrix to the plurality of computing devices based on a multi-party secret sharing protocol, wherein the multi-party secret sharing protocol provides that the general access structure secret matrix cannot be constructed without shares from an authorized set of the computing devices.

2. The method of claim 1, wherein the device specific channel errors are discrete gaussian errors and the method further comprising correcting the device gaussian errors using Golay codes.

3. The method of claim 1, wherein generating the device specific channel errors further comprising generating device specific channel errors based on digitized version of the CIRs of communication channels of the plurality of computing devices and the Golay code, wherein the Golay code may be at least one of 24-bit extended binary code or a 23-bit perfect binary code.

4. The method of claim 1, wherein training the linear regression model using the device specific channel errors further comprises training a learning with linear regression (LWLR) model.

5. The method of claim 1, wherein generating the general access structure secret matrix using the LWE secrets further comprises generating the general access structure secret matrix that encodes the LWE secrets in a square matrix of a dimension equal to the number of computing devices in the authorized set of the computing devices.

6. The method of claim 1, further comprising receiving a request to reconstruct the secret matrix and reconstructing the general access structure secret matrix using shares from the authorized set of the computing devices.

7. The method of claim 6, wherein reconstructing the general access structure secret matrix using shares from the authorized set of the computing devices further comprising verifying the shares from each of the authorized set of computing devices.

8. One or more tangible computer-readable storage media encoding computer-executable instructions for executing a computer process, the computer process comprising:
    generating channel impulse response (CIRs) of communication channels of the plurality of computing devices;
    determining, using a Golay code received from a Golay code generator, a vector of device specific channel errors of a plurality of computing devices based on the CIRs of communication channels of the plurality of computing devices;
    training a linear regression model using the vectors of the device specific channel errors from the plurality of computing devices to generate learning with error (LWE) secrets for each of the plurality of computing devices;
    generating a general access structure secret matrix using the LWE secrets from each of the plurality of computing devices; and
    distributing shares of the general access structure secret matrix to the plurality of computing devices based on a multi-party secret sharing protocol, wherein the multi-party secret sharing protocol provides that the general access structure secret matrix cannot be constructed without shares from an authorized set of the computing devices.

9. The one or more tangible computer-readable storage media of claim 8, wherein the device specific channel errors are discrete gaussian errors and the method further comprising correcting the device gaussian errors using Golay codes.

10. The one or more tangible computer-readable storage media of claim 8, wherein generating the device specific channel errors further comprising generating errors based on digitized version of the CIRs of communication channels of the plurality of computing devices.

11. The one or more tangible computer-readable storage media of claim 8, wherein training the linear regression model using the device specific channel errors further comprises training a learning with linear regression (LWLR) model.

12. The one or more tangible computer-readable storage media of claim 8, wherein generating the general access structure secret matrix using the LWE secrets further comprises generating the general access structure secret matrix that encodes the LWE secrets in a square matrix of a dimension equal to the number of computing devices in the authorized set of the computing devices.

13. The one or more tangible computer-readable storage media of claim 10, wherein the computer process further comprising receiving a request to reconstruct the general access structure secret matrix and reconstructing the general access structure secret matrix using shares from the authorized set of the computing devices.

14. The one or more tangible computer-readable storage media of 13, wherein reconstructing the secret matrix using shares from the authorized set of the computing devices further comprising verifying the shares from each of the authorized set of computing devices.

15. In a computing environment, a system comprising:
   memory;
   one or more processors units;
   a device specific multiparty computation system stored in the memory and executable by the one or more processor units, the multiparty computation attestation system encoding computer-executable instructions on the memory for executing on the one or more processor units, the computer process comprising:
   generating channel impulse response (CIRs) of communication channels of the plurality of computing devices;
   determining, using a Golay code received from a Golay code generator, a vector of device specific channel errors of a plurality of computing devices based on the CIRs of communication channels of the plurality of computing devices;
   training a linear regression model using the vectors of the device specific channel errors from the plurality of computing devices to generate learning with error (LWE) secrets for each of the plurality of computing devices;
   generating a secret matrix using the LWE secrets from each of the plurality of computing devices; and
   distributing shares of the secret matrix to the plurality of computing devices based on a multi-party secret sharing protocol, wherein the multi-party secret sharing protocol provides that the secret matrix cannot be constructed without shares from an authorized set of the computing devices.

16. The system of claim 15, wherein the device specific channel errors are discrete gaussian errors and the method further comprising correcting the device gaussian errors using Golay codes.

17. The system of claim 15, wherein generating the device specific channel errors further comprising generating device specific channel errors based on digitized version of the CIRs of communication channels of the plurality of computing devices.

18. The system of claim 15, wherein training the linear regression model using the device specific channel errors further comprises training a learning with linear regression (LWLR) model.

19. The system of claim 15, wherein generating the secret matrix using the LWE secrets further comprises generating the secret matrix that encodes the LWE secrets in a square matrix of a dimension equal to the number of computing devices in the authorized set of the computing devices.

20. The system of claim 15, wherein reconstructing the secret matrix using shares from the authorized set of the computing devices further comprising verifying the shares from each of the authorized set of computing devices.

* * * * *